June 7, 1932.  R. STRAMITZ  1,862,125
WELDING APPARATUS
Filed Jan. 24, 1927  2 Sheets-Sheet 1
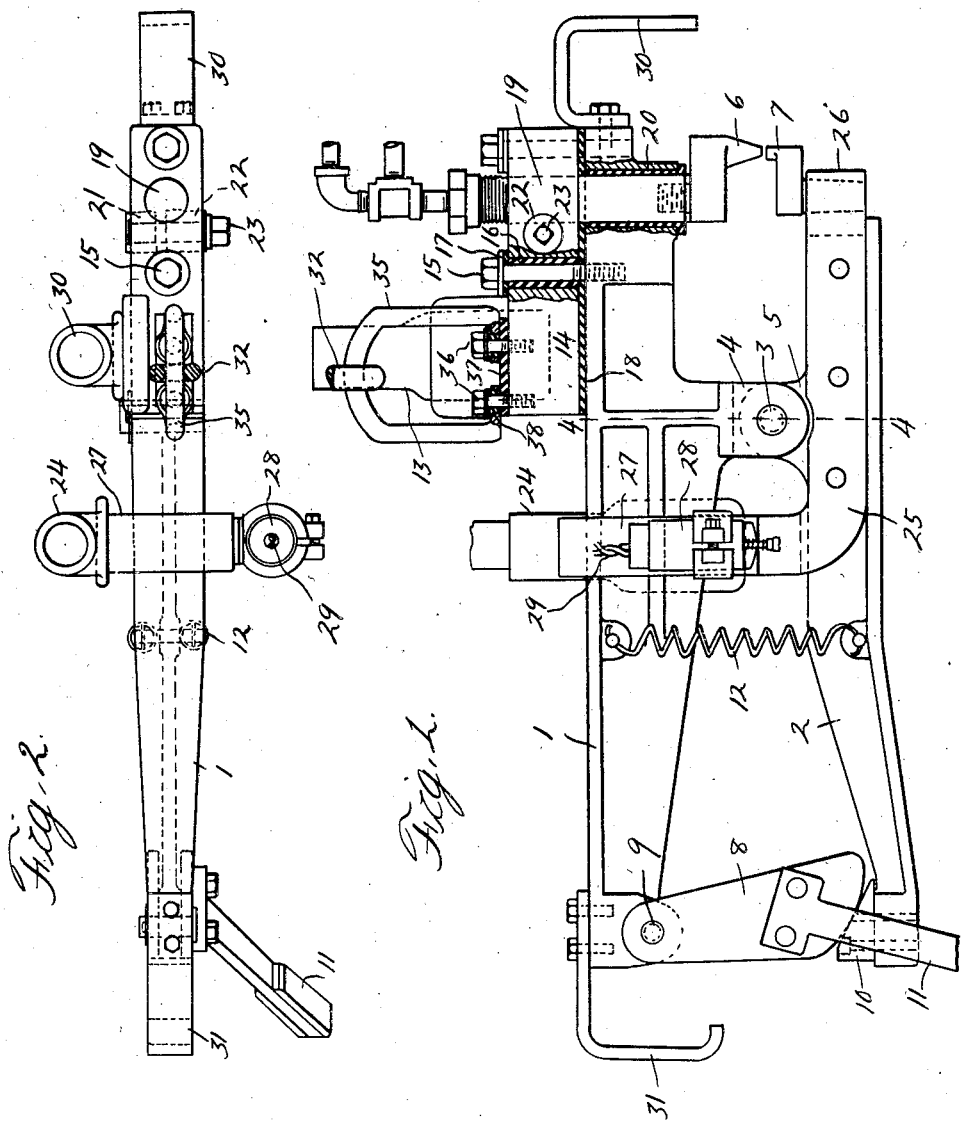
Inventor
Roman Stramitz
By Whittemore Hulbert Whittemore
Belknap
Attorneys June 7, 1932.  R. STRAMITZ  1,862,125
WELDING APPARATUS
Filed Jan. 24, 1927  2 Sheets-Sheet 2
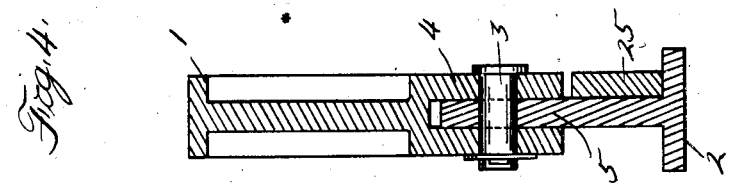
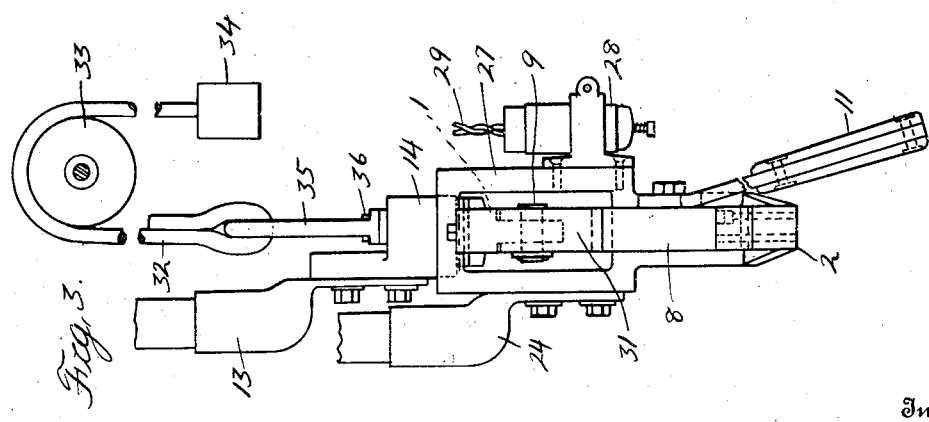
Inventor
Roman Stramitz
By Whittemore Hulbert Whittemore
Belknap
Attorneys Patented June 7, 1932

1,862,125

UNITED STATES PATENT OFFICE

ROMAN STRAMITZ, OF DETROIT, MICHIGAN, ASSIGNOR, BY MESNE ASSIGNMENTS, TO CHRYSLER CORPORATION, A CORPORATION OF DELAWARE

WELDING APPARATUS

Application filed January 24, 1927. Serial No. 163,279.

The invention relates to welding apparatus and has particular reference to spot welders. One of the objects of the invention is to provide a portable welder which may be readily moved about and applied at various locations. Another object is to provide an improved construction of welder having but few joints between the parts forming the electrical circuit through which the electrical current passes to the electrodes to thereby increase the efficiency of the welder. A further object is to provide a construction of welder having the electrical switch for controlling the electrical current passing to the electrodes as well as the means for relatively moving the electrodes toward each other so located that they are easily accessible. With these as well as other objects in view, the invention resides in the novel features of construction and combinations and arrangements of parts as more fully hereinafter set forth.

In the drawings:—

Figure 1 is a side elevation partly in section of a welding apparatus embodying my invention;

Figure 2 is a plan view thereof;

Figure 3 is an end view thereof;

Figure 4 is a cross section on the line 4—4 of Figure 1.

The welding apparatus is designed to permit two men to readily and easily move the welder about and to operate the same. The welder has a frame comprising upper and lower arms 1 and 2, respectively, which are preferably formed of cast aluminum to make the frame as light as possible. These arms are pivotally connected intermediate their ends by the pivot 3 which extends through the depending bifurcations 4 upon the upper arm and the upwardly extending lug 5 upon the lower arm. 6 and 7 are, respectively, the upper and lower cooperating electrodes respectively mounted upon the upper and lower arms at one end thereof. For swinging the arms relatively to each other to move the electrodes relatively toward each other, I have provided the cam 8 located at the opposite ends of the arms and pivotally connected at 9 to the upper arm and engageable with the bearing block 10 secured to the lower arm. This cam has secured thereto the actuating handle 11 which preferably extends at an angle to one side of the lower arm and depends to a point therebeneath. 12 are coil springs having their upper and lower ends connected respectively to the upper and lower arms at points between the cam 8 and the pivot 3, these coil springs tending to swing the arms relatively to each other to separate the electrodes.

To provide electrical conductors leading to the electrodes with but few joints between the parts forming the conductors to thereby increase the efficiency of the welder, I have formed electrical conductors for the upper and lower conductors which are respectively mounted upon the upper and lower arms 1 and 2 and upon which the electrodes are directly mounted. As shown, the electrical conductor for the upper electrode 6 comprises the upper terminal member 13 to which one end of the low voltage cable from the transformer is connected. This terminal member is rigidly secured to the upper conductor member 14 which is mounted upon the upper arm 1 above the upper electrode 6. This conductor member is secured to the arm by suitable means such as the cap screws 15 which are insulated from the conductor member by the insulator bushings 16 and insulator washers 17. 18 is an insulator plate between the conductor member and the arm for insulating the former from the latter. 19 is a plug extending downwardly through the conductor member 14 and in the lower end of which is screwed the upper electrode 6. This plug is also insulated from the upper arm by means of the insulator bushing 20. For rigidly securing the plug in the conductor member, I have provided the cooperating clamping blocks 21 and 22 which extend transversely of the conductor member and are clamped against the plug by means of the cap screw 23. The electrical conductor for the lower electrode 7 comprises the lower terminal member 24 to which one end of the electrical cable leading from the transformer is connected. This terminal member is rigidly secured to the lower conductor member 25 which is rigidly secured to the lower arm 2 and has the boss 26 at one end in which the lower electrode is rigidly mounted. The lower conductor member 25 has the yoke portion 27 through which the upper arm 1 extends and the lower terminal is connected to one side of this yoke portion. At the other side of this yoke portion is mounted the electrical switch 28 connected by the wires 29 to the primary of the transformer. It is to be noted that the switch which controls the flow of electrical current to the electrode is mounted at the same side of the pivot connecting the upper and lower arms as the cam for relatively swinging these arms so that one man may easily operate both.

To make the welder portable so that it may be readily moved about and applied at various locations in a steel body which is being assembled, for example, I provide means for yieldably suspending the welder and also provide means upon the welder frame for moving the same about. This latter means comprises the handles 30 and 31 which are rigidly connected to the opposite ends of the upper arm 1. The former means comprises the flexible connection in the nature of a cable 32 extending over a pulley 33 above the welder and connected at one end to the counterweight 34 for the welder and at its other end to the U-shaped bracket 35 which is rigidly secured to the upper conductor member 14 as by means of the cap screws 36. This bracket is insulated from the conductor member by means of the insulator plate 37 between the bracket and the conductor member and the insulator bushings 38 surrounding the cap screws. To avoid interference with the workmen the low voltage cable connected to the secondary of the transformer as well as the wires between the switch upon the welder and the transformer primary are also preferably yieldably suspended from a point above the welder.

What I claim as my invention is:

1. In welding apparatus, a welder having an upper arm and a lower arm pivotally connected to said upper arm, a conductor member mounted upon said lower arm, an electrode mounted directly upon said conductor member, a conductor member mounted upon and insulated from said upper arm and an electrode directly mounted upon said last mentioned conductor member and adapted to cooperate with said first mentioned electrode.

2. In welding apparatus, the combination with a welder having upper and lower arms pivotally connected to each other intermediate their ends, cooperating electrodes at one end of said arms, a cam at the other end of said arms for swinging said arms relative to each other, hand grips at the opposite ends of one of said arms, electrical conductors leading to said electrodes and including cables extending from a point above said arms, an electrical switch upon one of said arms and wires leading upwardly above said arms from said switch, of means connected to the upper of said arms for yieldably suspending said welder to form a portable welder.

3. In welding apparatus, the combination with an upper arm and an electrode mounted thereupon, of a lower arm pivotally connected to said upper arm, an electrode mounted upon said lower arm and adapted to cooperate with said first mentioned electrode, and electrical conductors to said electrodes including a conductor member mounted upon said lower arm and having a yoke portion through which said upper arm extends.

In testimony whereof I affix my signature.

ROMAN STRAMITZ.